United States Patent
Ellis et al.

(10) Patent No.: US 11,270,309 B1
(45) Date of Patent: Mar. 8, 2022

(54) BIOMETRIC TOKEN THAT FUNCTIONS AS A UNIVERSAL IDENTIFIER

(71) Applicant: Wells Fargo Bank, N.A., San Francisco, CA (US)

(72) Inventors: Jinee K. Ellis, San Francisco, CA (US); Timothy R. Knowlton, San Francisco, CA (US); Ashish B. Kurani, Hillsborough, CA (US); Steven E. Puffer, Champlin, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 932 days.

(21) Appl. No.: 15/003,390

(22) Filed: Jan. 21, 2016

Related U.S. Application Data

(60) Provisional application No. 62/272,410, filed on Dec. 29, 2015.

(51) Int. Cl.
*G06Q 20/00* (2012.01)
*G06Q 20/40* (2012.01)

(52) U.S. Cl.
CPC .............. *G06Q 20/40145* (2013.01)

(58) Field of Classification Search
USPC .......................................................... 705/44
See application file for complete search history.

(56) References Cited

U.S. PATENT DOCUMENTS

| | | | | |
|---|---|---|---|---|
| 7,886,156 B2 | 2/2011 | Franchi | | |
| 8,739,266 B2 | 5/2014 | Buer | | |
| 9,826,463 B2 * | 11/2017 | Sienicki | ................... | H04W 4/21 |
| 10,204,704 B1 * | 2/2019 | Wurst | ...................... | G16Z 99/00 |
| 2008/0091833 A1 * | 4/2008 | Pizano | .................. | G06F 21/602 709/229 |
| 2010/0138668 A1 * | 6/2010 | Tsuria | .................... | H04H 60/23 713/186 |
| 2010/0250290 A1 * | 9/2010 | Lefkowitz | ............ | G06Q 20/204 705/5 |
| 2013/0110658 A1 * | 5/2013 | Lyman | .................. | G06Q 20/20 705/18 |
| 2014/0136419 A1 * | 5/2014 | Kiyohara | ........... | G06Q 20/3221 705/67 |
| 2014/0149293 A1 | 5/2014 | Laracey | | |
| 2014/0229388 A1 * | 8/2014 | Pereira | ................... | G06Q 20/12 705/76 |
| 2015/0058129 A1 | 2/2015 | Nevid et al. | | |

(Continued)

OTHER PUBLICATIONS

Operational Bio-Hash to Preserve Privacy of Fingerprint Minutiae Templates (Year: 2014).*

*Primary Examiner* — Bruce I Ebersman
(74) *Attorney, Agent, or Firm* — Foley & Lardner LLP

(57) ABSTRACT

Systems and methods for identifying a user to a merchant are described. A token service provider facilitates the identification of the user. Identifying the user at the merchant is accomplished by the user broadcasting a token associated with the user or by the merchant capturing a biometric of the user. The token or biometric is sent to the token service provider computing system. The token service provider computing system identifies the user based on the token or biometric. The token service provider computing system may send user information associated with the token and the user to the merchant computing system.

7 Claims, 5 Drawing Sheets

(56) References Cited

U.S. PATENT DOCUMENTS

| | | | |
|---|---|---|---|
| 2015/0127547 A1* | 5/2015 | Powell | G06Q 20/4016 |
| | | | 705/67 |
| 2015/0150110 A1 | 5/2015 | Canning et al. | |
| 2015/0172999 A1* | 6/2015 | Sienicki | H04L 69/04 |
| | | | 370/254 |
| 2015/0254664 A1* | 9/2015 | Bondesen | G06Q 20/3821 |
| | | | 705/44 |
| 2016/0110529 A1* | 4/2016 | Mathew | G06F 21/31 |
| | | | 726/7 |

* cited by examiner

BIOMETRIC TOKEN THAT FUNCTIONS AS A UNIVERSAL IDENTIFIER

CROSS-REFERENCE TO RELATED APPLICATIONS

This application claim the benefit of priority to U.S. Provisional Application No. 62/272,410, filed Dec. 29, 2015, which is hereby incorporated by reference in its entirety.

BACKGROUND

Increasingly, merchants are moving away from storing information associated with customers that might be considered a security risk. However, merchants still need access to customer information to provide customer loyalty programs, advertisements and the like. In addition, customers often provide similar information to different merchants (e.g., first and last name, email, phone number, etc.), and the information is stored separately for every merchant. Merchants may also want to interact with a customer when the customer is at the merchant. For example, the merchant may want to send coupons, sale information or the customer's loyalty information to a mobile device of the customer. Further, merchants may want the ability to identify the customer when the customer enters a location of the merchant. Therefore, enhanced customer identifier and information services would be desirable.

SUMMARY

One embodiment relates to a method of identifying a user using a token service provider. The method includes creating, by a token service provider computing system associated with the token service provider, a user account with the token service provider for the user, wherein the user account contains user information. The method further includes creating, by the token service provider computing system, a token for the user. The token identifies the user by the user information and is activated by the user before being broadcasted. The method includes sending, by the token service provider computing system, the token to a user device associated with the user. The method further includes receiving, by the token service provider computing system, the token from a merchant computing system associated with a merchant. The method includes identifying, by the token service provider computing system, the user and the user information based on the token.

Another embodiment relates to a method of identifying a user using an identity provider. The method includes creating, by an identity provider computing system associated with the identity provider, a user account with the identity provider for the user. The user account contains user information. The method further includes receiving, by the identity provider computing system and from a user device associated with the user, a verified user biometric. The method includes receiving, by the identity service provider computing system, a user biometric from a merchant computing system associated with a merchant. The method further includes comparing, by the identity service provider, the user biometric to the verified user biometric to identify the user and the user information.

Yet another embodiment relates to an identity provider computing system. The system includes a network interface circuit structured to communicate data to and from devices via a network. The system further includes a token vault storing a plurality of associations between tokens and user accounts and an account database storing user information concerning a plurality of user accounts. The system includes an identifier circuit structured to receive a token or a user biometric from a merchant computing system associated with a merchant, and to identify a user based on the token or the user biometric.

These and other features, together with the organization and manner of operation thereof, will become apparent from the following detailed description when taken in conjunction with the accompanying drawings.

DETAILED DESCRIPTION

Referring to the figures generally, systems and methods for identifying a user to a merchant are described. A token service provider facilitates the identification of the user. Identifying the user at the merchant is accomplished by the user broadcasting a token associated with the user and the token service provider. In some arrangements, the user broadcasts the token via a mobile device of the user to a merchant computing system associated with the merchant. The token is captured by the merchant computing system and is sent to the token service provider computing system. In other arrangements, the token is generated based on a gathered biometric of the user by the merchant (e.g., facial image, voice sample, fingerprint, etc.). The token service provider computing system identifies the user based on the token. The token service provider computing system may send user information associated with the token and the user to the merchant computing system. The merchant computing system can use the user information to send merchant sales, advertisements, coupons, loyalty information and the like to the user device of the user.

Figure 1:
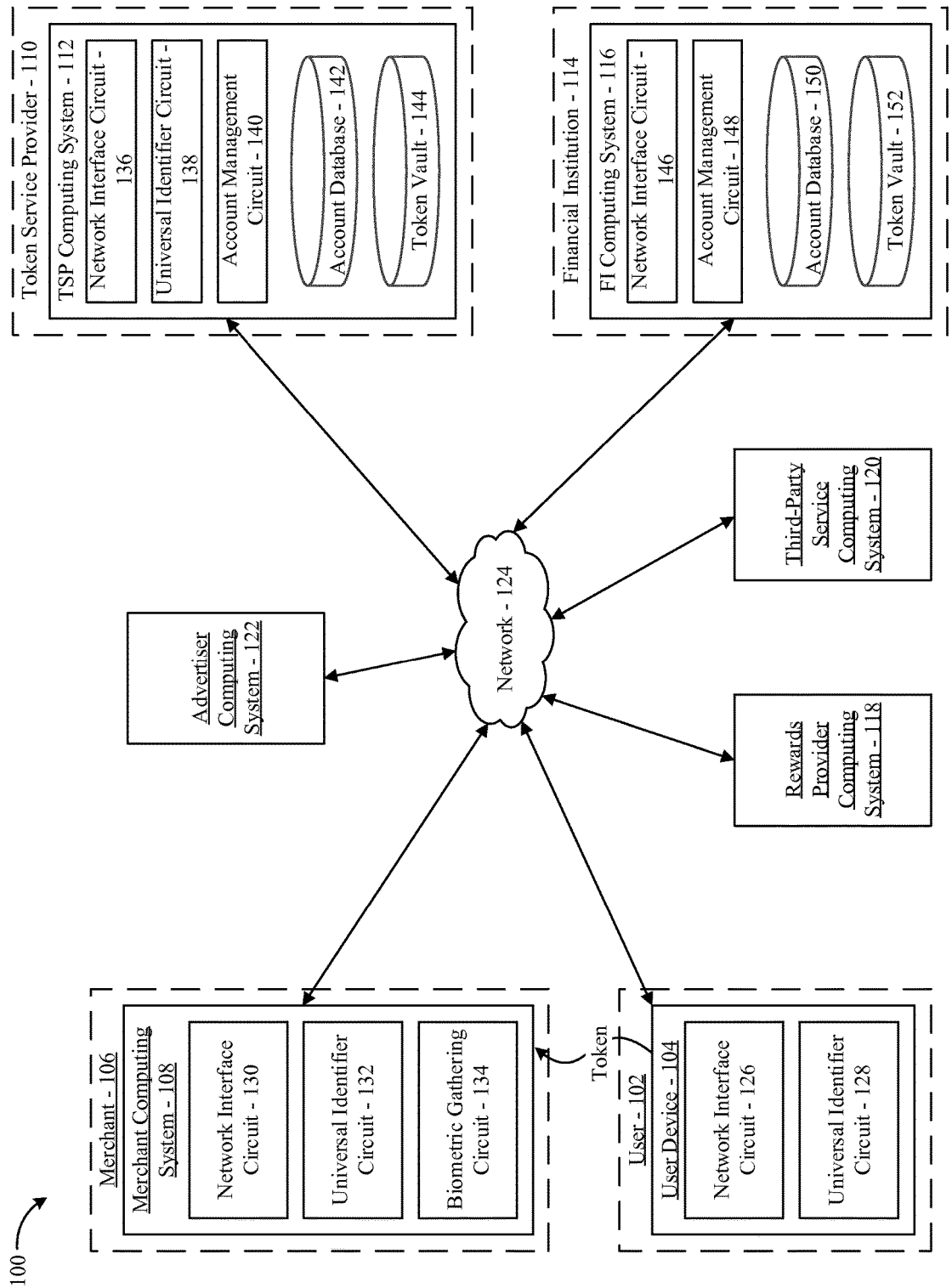
FIG. 1 is a diagram of a computing system, according to an example embodiment.

Referring to FIG. 1, a diagram of computing system 100 is shown. The computing system 100 includes a user device 104 associated with a user 102, a merchant computing system 108 associated with a merchant 106, a token service provider computing system 112 (designated as "TSP Computing System" in FIG. 1) associated with a token service provider 110, a financial institution computing system 116 (designated as "FI Computing System" in FIG. 1) associated with a financial institution 114, a rewards provider computing system 118, a third-party service computing system 120, an advertiser computing system 122, and a network 124. Although shown as including a single user 102 and a single merchant 106, multiple users 102 and merchants 106 may be included in the system 100. Similarly, multiple token service providers, financial institutions, advertisers, rewards providers, and the like can exist in the system 100. The components and the operation of the system 100 are described in further detail below.

In the system 100, the user 102 is a customer of the merchant 106 and has registered with the token service provider 110. In some arrangements, the user 102 is a member of a loyalty program associated with the merchant 106. The user 102 is associated with the user device 104. The user device 104 may be, but is not limited to, a phone (e.g., smartphone, etc.), a mobile computing device (e.g., tablet computer, laptop computer, person digital assistant, etc.), a desktop computing device, a wearable computing device, or the like. A wearable computing device may refer to any type of computing device that the user 102 wears including, but not limited to, a smart watch, smart eyewear (e.g., smart eye glasses, smart sun glasses, smart contact lenses, etc.), a smart bracelet, etc. In some arrangements, multiple users are associated with the same user device 104. For example, a husband and wife may be associated with the same tablet computer. In additional arrangements, the user 102 is associated with multiple user devices 104. For example, a single user 102 can be associated with multiple smartphones.

The user computing device 104 includes a network interface circuit 126 and a universal identifier circuit 128. The network interface circuit 126 is structured to facilitate data communication to and from other devices via the network 124. In some arrangements, data passing through the network interface circuit 126 is encrypted. The network interface circuit 126 may include any combination of wired network protocols (e.g., Ethernet, USB, Thunderbolt, etc.) and wireless network protocols (e.g., WiFi, Bluetooth, CDMA, GSM, LTE, ZigBee, etc.). The universal identifier circuit 128 is structured to allow the user device 104 to communicate data to and from the merchant computing system 108, the token service provider computing system 112, the financial institution computing system 116, and other computing systems via the network interface circuit 126 and the network 124. For example, the universal identifier circuit 128 may include a user interface that permits the user 102 to provide user information to the token service provider computing system 112 via the user device 104 (e.g., token broadcast information), token information to the merchant computing system 108, or the like. In some arrangements, the universal identifier circuit 128 includes programming instructions stored in memory of the user device 104 that is executed locally on the user device 104 (e.g., as a smartphone application). In other arrangements, the universal identifier circuit 128 includes a web-based interface application accessed via the network 124 (e.g., the Internet) on a web browser executed on the user device 104. In such arrangements, the universal identifier circuit 128 is executed at least in part remotely and is maintained remotely (e.g., on the token service provider computing system 112). In this instance, the user 102 logs onto or accesses the web-based interface to access the universal identifier circuit 128. In some arrangements, the universal identifier circuit 128 is supported by a separate computing system comprising one or more servers, processors, network interface circuits, etc. that transmit the applications for use to the user computing device 104. In further arrangements, the universal identifier circuit 128 includes an application programming interface (API) and/or a software development kit (SDK) that facilitate the integration of other applications (e.g., a mobile banking application, a merchant loyalty application, etc.) with the universal identifier circuit 128. Through the universal identifier circuit 128, the user 102 can register with the token service provider 110, provide verified biometric information to the token service provider 110, receive a user token, wirelessly broadcast the user token (e.g., via the network interface circuit 126) to the merchant computing system 108, and associate a payment source with the token service provider 110. In some arrangements, the user 102 can choose to selectively or continuously broadcast the user token.

The merchant 106 may be any of a plurality of merchant types (e.g., department stores, grocery stores, clothing stores, service providers, gas stations, health services providers, fitness centers, insurance companies, etc.). Generally, the merchant 106 provides goods and/or services to customers (e.g., the user 102). The merchant 106 is associated with the merchant computing system 108. As described in further detail below, in some arrangements, the merchant computing system 108 is structured to receive a token or a general broadcast from user device 104 and transmit the token or broadcast to the token service provider computing system 112 via the network 124. In other arrangements, the merchant computing system 108 is structured to gather a biometric related to the user 102. The merchant computing system 108 is also configured to receive user information from the token service provider computing system 112 and/or the financial institution computing system 116. The merchant computing system 108 may also be configured to send and receive information from the user computing device 104, the advertiser computing system 122, the third-party service computing system 120, and the rewards provider computing system 118 via network 124. In some arrangements, the merchant computing system 108 includes a point of sale (POS) terminal or is associated with a POS terminal.

The merchant computing system 108 includes a network interface circuit 130 and a universal identifier circuit 132. The network interface circuit 130 is structured to facilitate data communication to and from other devices via the network 124. In some arrangements, data passing through the network interface circuit 130 is encrypted. The network interface circuit 130 may include any combination of wired network protocols (e.g., Ethernet, USB, Thunderbolt, etc.) and wireless network protocols (e.g., WiFi, Bluetooth, CDMA, GSM, LTE, ZigBee, etc.). The universal identifier circuit 132 is structured to allow the merchant computing system 108 to communicate data to and from the user device 104, the token service provider computing system 112, the financial institution computing system 116, and other computing systems via the network interface circuit 130 and the network 124. For example, the universal identifier circuit 132 allows the merchant computing system 108 to receive a token from the user device 104 and to exchange the token for user information with the token service provider computing system 112. In some arrangements, the universal identifier circuit 132 includes programming instructions stored in memory of the merchant computing system 108 that is executed locally on the merchant computing system 108. In other arrangements, the universal identifier circuit 132 includes a web-based interface application accessed via the network 124 (e.g., the Internet) on a web browser executed on the merchant computing system 108 (e.g., as described above with respect to the universal identifier circuit 128).

In some arrangements, the merchant computing system 108 includes a biometric gathering circuit 134. The biometric gathering circuit 134 is structured to capture a biometric of the user 102 when the user is present at a location of the merchant 106. The biometric may include any of an image of the user 102 (e.g., a picture of the user's face), a voice print of the user 102, a fingerprint of the user 102, or a retina/iris scan of the user 102. Accordingly, the biometric gathering circuit receives input from a biometric gathering device associated with the merchant computing system 108. The biometric gathering device may include any of a camera, a microphone, a fingerprint scanner, a retina scanner, and/or an iris scanner. In some arrangements, the biometric gathering circuit 134 provides the gathered biometric (e.g., image file, audio file, etc.) of the user 102 to the universal identifier circuit 132 for forwarding to the token service provider computing system 112. In other arrangements, the biometric gathering circuit 134 performs a transformation of the gathered biometric (e.g., image file, audio file, etc.) to convert the file into a character or numeric hash that is then provided to the universal identifier circuit 132 for forwarding to the token service provider computing system 112.

The token service provider 110 includes the token service provider computing system 112. The token service provider 110 may be an independent service provider or associated with another party of the computing system 100 (e.g., the financial institution 114, the merchant 106, etc.). The token service provider 110 provides token account services to a plurality of users, including the user 102, and a plurality of merchants, including the merchant 106. The token service provider computing system 112 maintains a token and user information associated with the user 102 provides user information, such as identity information and merchant loyalty information (when authorized), to other parties (e.g., the merchant 106, the financial institution 114, etc.). In some arrangements, the token service provider computing system 112 maintains preference information set by the user 102.

The token service provider computing system 112 includes a network interface circuit 136 and a universal identifier circuit 138. The network interface circuit 136 is structured to facilitate data communication to and from other devices via the network 124. In some arrangements, data passing through the network interface circuit 136 is encrypted. The network interface circuit 136 may include any combination of wired network protocols (e.g., Ethernet, USB, Thunderbolt, etc.) and wireless network protocols (e.g., WiFi, Bluetooth, CDMA, GSM, LTE, ZigBee, etc.). The universal identifier circuit 138 is structured to allow the token service provider computing system 112 to receive token information from the merchant computing system 108, transmit user information to the merchant computing system 108, communicate token request information to and from the user device 104, and communicate data to and from the financial institution computing system 116. The universal identifier circuit 138 includes programming instructions stored in memory of the token service provider computing system 112 that is executed locally on the token service provider computing system 112.

The token service provider computing system 112 also includes an account management circuit 140 and an account database 142. The account database 142 stores user information relating to the user 102 and merchant information relating to the merchant 106. The user information may include personal information such as a first name and a last name of the user 102, email addresses associated with the user 102, addresses associated with the user 102, phone numbers associated with the user 102, rewards program information (e.g., rewards program account numbers for various merchants) associated with the user 102, user preferences, and the like. In addition, the user information may include information specific to a merchant (e.g., merchant 106) associated with the user 102. For example, if the merchant 106 is a department store where the user 102 has a credit card associated with the merchant 106, the account database may store user information including account numbers, credit limits, loyalty program information and the like. The merchant information may include information relating to user accounts with the merchant, merchant subscription information, merchant biometric gathering capabilities, and the like. The account management circuit 140 is structured to maintain the account database 142. In some arrangements, the account management circuit 140 facilitates access to the account database 142 for the universal identifier circuit 138.

The token service provider computing system 112 also includes a token vault 144. The token vault 144 stores tokens and token association information relating individual tokens to specific users. For example, the token vault 144 stores associations between issued tokens and the account numbers (e.g., a user account associated with the user 102) that the tokens are proxies for. In some arrangements, the token vault 144 is communicably and operatively coupled to the account database 142 via the account management circuit 140. Accordingly, when the token service provider computing system 112 receives an information request including a token associated with the user 102 from the merchant computing system 108, the universal identifier circuit 128 provides the token to the account management circuit 140, and the account management circuit 140 cross-references the token vault 144 to identify the user account that the token serves as a proxy for. Based on the user account, the account management circuit 140 cross-references the account database 142 to identify user information related to the user account in order to provide the appropriate information to the merchant 106 in response to the request. The requested information may relate to user information from the account database such as loyalty information relating to the user 102 associated with the token, or the like. In some arrangements, the token service provider computing system 112 can provide the merchant computing system 108 a payment source associated with the user 102 for use in a transaction between the user 102 and the merchant 106.

Still referring to FIG. 1, the financial institution 114 includes the financial institution computing system 116. Through the financial institution computing system 116, the financial institution 114 provides financial account services to a plurality of users, including the user 102. In some arrangements, the financial institution 114 also provides financial services to the merchant 106. The financial services may include demand deposit account services, credit card services, debit card services, card processing services, money transfer services, and the like. The financial institution computing system 116 maintains information about the financial institution 114, information regarding the account(s) held by account holders (including the user 102) at the financial institution 114.

The financial institution computing system 116 includes a network interface circuit 146 and a universal identifier circuit 138. The network interface circuit 146 is structured to facilitate data communication to and from other devices via the network 124. In some arrangements, data passing through the network interface circuit 146 is encrypted. The network interface circuit 146 may include any combination of wired network protocols (e.g., Ethernet, USB, Thunderbolt, etc.) and wireless network protocols (e.g., WiFi, Bluetooth, CDMA, GSM, LTE, ZigBee, etc.).

The financial institution computing system 116 includes an account management circuit 148 and an account database 150 that stores user information and account information relating to accounts held by the user 102. The account database 150 may store user account information including account numbers, balances, credit limits, and the like. The account database 150 may also log transaction the user 102 makes using funds from the financial institution 114. Information stored in the account database 150 is managed (e.g., added, deleted, modified, accessed, etc.) by the account management circuit 148.

In some arrangements, the financial institution computing system 116 includes a token vault 152 structured to store tokens and information pertaining thereto of users. For example, the token vault 152 stores associations between tokens issued by the financial institution 114 (e.g., payment tokens) and the account numbers (e.g., credit card numbers) that the tokens are proxies for. The token vault 152 may be communicably and operatively coupled to the account database 150 via the account management circuit 148. Accordingly, when the financial institution computing system 116 receives an information request including a token from a different entity (e.g., a payment token from a POS system associated with the merchant 106), the financial institution computing system 116 cross-references the token vault 152 to identify the information that the token serves as a proxy for (e.g., a credit card number) in order to provide the requested information to the requesting entity or another entity (e.g., a payment network). The requested information may relate to an account number from the account database 150, user information relating to the user 102 associated with the token, or the like. In some arrangements, the token vault 152 is maintained by a third-party. The third-party may be the token service provider 110 or another organization. For example, a payment network (e.g., Visa, MasterCard, etc.) may serve as a token vault 152 for credit card issuers (e.g., financial institutions).

The token service provider 110, at the request of the user 102, can store financial account information associated with the user 102 in the account database 142 of the token service provider computing system 112. For example, the user 102 can associate a payment source, such as a credit card (e.g., credit card primary account number, credit card expiration date, credit card verification code, credit card billing information, etc.), a bank account (e.g., bank account and routing numbers), or another payment source issued by the financial institution 114, with the user's account with the token service provider 110. Accordingly, the user 102 can facilitate provision of payment information to the merchant 106 via the token service provider 110.

The advertiser computing system 122, the third-party service computing system 120, and the rewards provider computing system 118 are configured to receive and transmit information to the user device 104, the token service provider computing system 112, and the merchant computing system 108. The advertiser computing system 122 may provide advertisements, sales information, or other notifications to the user device 104. The third-party service computing system 120 may be associated with a service used by the merchant 106 or user 102 that provides additional services. For example, the third-party service computing system 120 may provide manufacturer's coupon to the user device 104 and/or to the merchant computing system 108. The rewards provider computing system 118 may provide loyalty programs to the merchant 106 and to the user 102 (e.g., a rewards provider that encompasses several brands of merchants, a third-party rewards program, etc.).

Figure 2:
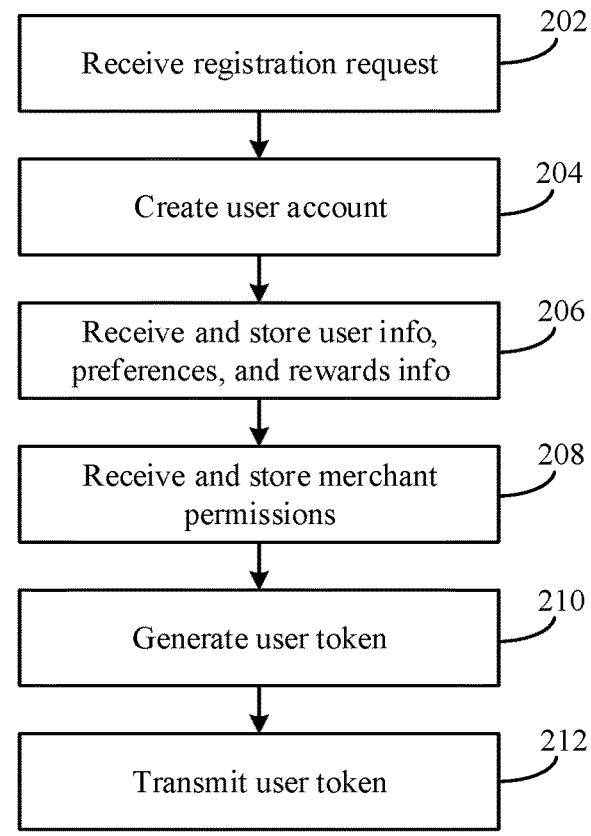
FIG. 2 is a flow diagram of a method of registering a user with the token service provider of FIG. 1 according to an example embodiment.

Referring to FIG. 2, a flow diagram of a method of registering the user 102 with the token service provider 110 is shown according to an example embodiment. The method 200 is performed by the token service provider computing system 112 (e.g., by the universal identifier circuit 138 and the account management circuit 140). After completion of the method 200, the user 102 can identify themselves to the merchant 106 by broadcasting a token associated with the user 102. Based on user permissions and preferences, the token service provider 110 will then provide the merchant 106 with information relating to the user.

The method 200 begins when a registration request is received at 202. The token service provider computing system 112 receives the registration request from the user device 104. The user 102 sends the request to the token service provider computing system 112 by interacting with the user interface generated by the universal identifier circuit 128 of the user device 104. The request indicates that the user 102 wishes to participate in the token identification services provided by the token service provider 110. In some arrangements, the request includes user information, such as name, address, phone number, e-mail address, and the like.

A user account is created at 204. The token service provider computing system 112 creates a user account based on the user information included in the registration request received at 202. In some arrangements, the token service provider computing system 112 generates a unique token service account number for the user. In other arrangements, the user 102, via the user device 104, provides the token service provider computing system 112 with a desired username that serves as an account number. The token service provider computing system 112 stores the user account information in the account database 142.

User information, preferences, and rewards information are received and stored at 206. The token service provider computing system 112 receives user information, user preferences, and rewards information associated with the user 102 from the user device 104. In some arrangements, the information and preferences received at 206 are received in response to an initial inquiry sent from the token service provider computing system 112 to the user device 104. The user information may include additional personal information relating to the user 102, such as name, address, phone number, e-mail address, and the like. The preferences include user preferences, such as preferred mode of contact (e.g., SMS, e-mail, phone, paper mail, etc.), security or authentication preferences (e.g., how many factor authentication is required before the user 102 is verified, password information, biometric authentication information, etc.), and the like. The rewards information includes an identification of merchants (e.g., the merchant 106) with which the user 102 is enrolled in a rewards program with and any associated rewards account numbers. The token service provider computing system 112 stores the information received at 206 in an entry associated with the user account in the account database 142.

In some arrangements, the user information received at 206 includes identification of a payment source associated with the user 102. The payment source may be a credit card, a debit card, a bank account, or the like. In another arrangement, the user information received at 206 includes an identification of a plurality of payment sources associated with the user 102. In such arrangements, the user information may include an identification of a default payment source or a preferred order of payment sources for the plurality of payment sources. In either arrangement, the token service provider computing system 112 verifies each provided payment source with the associated financial institution (e.g., the financial institution computing system 116) by requesting confirmation of the payment source and payment source ownership by the user 102 from the associated financial institution computing system (e.g., the financial institution computing system 116). If the payment sources are verified by their respective financial institutions, the token service provider computing system 112 stores the payment source information with the entry associated with the user account in the account database 142. If the payment sources are not verified by their respective financial institutions, the token service provider computing system 112 rejects the provided payment source information by sending an error message to the user device 104.

User merchant permissions are received and stored at 208. The token service provider computing system 112 receives merchant permissions from the user device 104. The merchant permissions indicate the amount of user information that is accessible to a given merchant (e.g., the merchant 106) when the user 102 identifies himself to the given merchant and the level of authentication required for the given merchant. For example, in some arrangements, the merchant 106 is automatically provided access to the user's name and rewards account information without additional authentication requirements. In other arrangements, when the merchant 106 receives the token or biometric, the merchant permissions require that the token service provider computing system 112 request permission from the user 102 prior to sharing any information with the merchant computing system 108.

A user token is generated at 210. The token service provider computing system 112 generates a unique user token for the user 102. The token service provider computing system 112 stores the generated token and the association between the token and the user account in the token vault 144. In an alternative arrangement, the user 102 provides verified biometric information that serves as the token. In such an arrangement, the user 102 may provide the verified biometric information to token service provider computing system 112 via biometric scanners of the user device 104 (e.g., by taking a picture of the user's face through a camera of the user device 104, by taking a picture of the user's eye through a camera of the user device 104, by recording a voice sample through a microphone of the user device 104, by providing a fingerprint to a fingerprint scanner of the user device 104, etc.). In such arrangements, the through a camera of the user device 104 may convert the provided biometric file (e.g., image file, audio file, etc.) into a string of characters representing the biometric through a biometric conversion algorithm. The string of characters may further be hashed (e.g., encrypted by signing with a private key) to secure the biometric. The string of characters (or hashed string of characters) serves as the token for the user 102. The token service provider computing system 112 stores the string of characters (or hashed string of characters) and the association between the token and the user account in the token vault 144. In some arrangements, multiple tokens can be assigned to the user 102. For example, the user 102 may have an associated biometric token and a system generated token associated with the user's account in the token vault 144.

The user token is transmitted at 212. The token service provider computing system 112 sends the token to the user device 104 for storage in the universal identifier circuit 128. In some arrangements, the token service provider computing system 112 transmits a single token to the user device 104. In other arrangements, the token service provider computing system 112 transmits a plurality of tokens to the user device 104. The token is stored on the user device 104 and is accessible via the universal identifier circuit 128 such that the user 102 can selectively broadcast the token to the merchant computing system 108. In some arrangements, the token is embedded in an installation file generated by token service provider computing system 112 and sent to the user device 104. In such arrangements, when the user device 104 receives the installation file, supporting software (e.g., that form part of the universal identifier circuit 128, a token service provider smartphone application, etc.) is installed on the user device 104 thereby enabling the user device 104 to broadcast the token to the merchant computing system 108.

Figure 3:
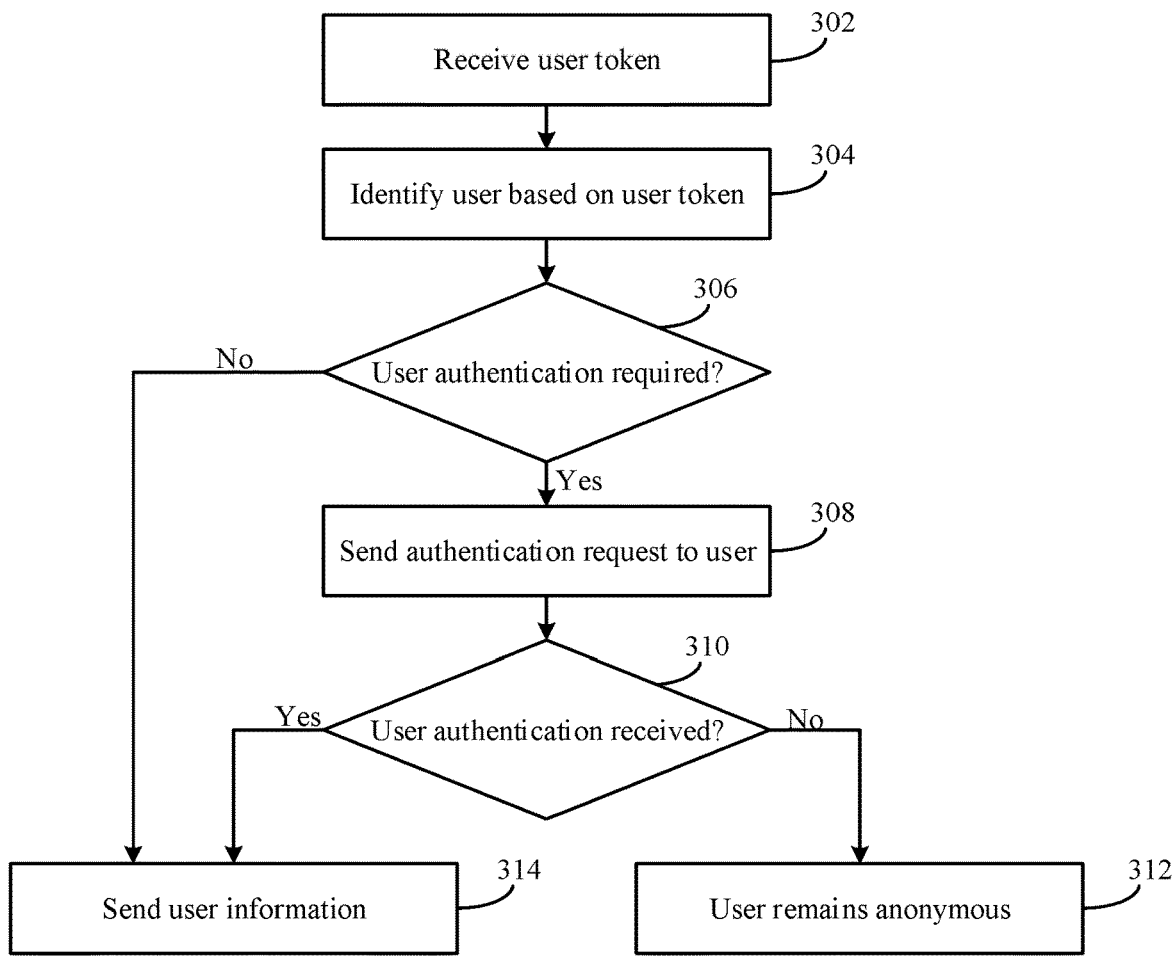
FIG. 3 is a flow diagram of a method of selectively identifying a user to a merchant through the token service provider and the merchant of FIG. 1 according to an example embodiment.

Referring to FIG. 3, a method 300 of selectively identifying the user 102 to the merchant 106 through the token service provider 110 is shown according to an example embodiment. The method 300 is performed by the token service provider computing system 112 (e.g., by the universal identifier circuit 138). After completion of the method 200 (as described above), the user 102 identifies themselves to the merchant 106 by broadcasting a token associated with the user 102 via the user device 104 to the merchant computing system 108. As described in further detail below, the merchant computing system 108 sends the token to the token service provider 110, where the token can be exchanged for information relating to the user 102.

The method 300 begins when a user token is received at 302. The token service provider computing system 112 receives the token. In some arrangements, the token is received from the merchant computing system 108. In such arrangements, the user 102 selectively broadcasts the user token via the user device 104 (e.g., by activating the token via the universal identifier circuit 128 such that the token is broadcast via a wireless connection) when the user 102 is within a location or in the vicinity of a location of the merchant 106, and the merchant computing system 108 receives the token. The merchant computing system 108 then transmits the received user token to the token service provider computing system 112. In further arrangements, the user 102 provides the token to the merchant computing system 108 via a merchant website of the merchant 106 in situations in which the user 102 is accessing the merchant website. In such arrangements, the merchant computing system 108 then provides the user token to the token service provider computing system 112. In yet further arrangements, the user 102 transmits the token directly to the token service provider computing system 112 along with a merchant identifier thereby indicating that the user 102 wishes to provide information to the merchant 106. As noted above, the user token is a string of characters that serves as a proxy for a user account with the token service provider 110, where user information can be accessed and provided to the merchant 106. In some arrangements, the token is received as part of an information request identifying specific requested fields of user information. For example, if the token is received from a merchant computing system 108, the merchant may request specific pieces of user information, such as the name of the user 102 and a rewards account number of the user 102.

The user is identified based on the user token at 304. The token service provider computing system 112 cross references the token vault 144 with the received user token to identify the associated user account. If no user account is associated with the received token, the token service provider computing system 112 may return an error message to the merchant computing system 108, and the method 300 ends. In arrangements where a user account is identified, the method 300 continues.

The token service provider computing system 112 determines whether additional user authentication is required at 306 before providing the requested user information to the merchant 106. The token service provider computing system 112 cross-references the account database 142 to determine the authentication preferences of the user 102. In some arrangements, the user 102 configured the account such that the user 102 is required to authenticate all merchant requests for user information. In other arrangements, the user 102 configured the user account such that the user 102 is required to authenticate the certain merchant requests for user information based on an identity of the requesting merchant and/or the requested information. For example, certain pieces of user information, such financial account information, social security information, the user's address, and the like, may require a higher level of user authentication before being provided to the merchant 106.

If additional user authentication is required, an authentication request is sent to the user at 308. The token service provider computing system 112 formats and transmits an authentication request to the user device 104 associated with the user 102. The authentication request includes a date and time of the token transmittal (at 302) and an identity of the merchant 106 that is requesting information about the user 102. In some arrangements, the authentication request may be formatted as a text message or an e-mail based on the user's preferences (e.g., as set in method 200 at 206). In such arrangements, the user 102 can respond to the message or e-mail or click on an embedded hyperlink that authenticates the request. In other arrangements, the authentication request is formatted as an in-application push message. In some arrangements, the authentication request includes a request for the user 102 to provide the user's password or a biometric to authenticate the information request. In further arrangements, the authentication includes matching a determined location of the user device 104 to a location of the merchant 106 (e.g., via GPS).

The token service provider computing system 112 determines whether user authentication is received at 310 in response to the request sent at 308. In some arrangements, the token service provider computing system 112 provides a response window (e.g., two minutes) for the user 102 to respond to the authentication request of 308. If the user authentication is not received at 310, the user's identity is not transmitted, and the user remains anonymous at 312. In some arrangements, the token service provider computing system 112 transmits an error to the merchant computing system 108, and the method 300 ends.

If the user authentication is received at 310 or if no user authentication is required at 306, user information is sent at 314. The token service provider computing system 112 retrieves the requested user information from the account database 142 and transmits the requested user information to the merchant computing system 108. The user information may include standard information about the user (e.g., first and last name, address, email, etc.), information relating to the user 102 and the merchant 106 (e.g., loyalty number, customer number, etc.), or the like. The token service provider computing system 112 can be configured such that the specific user information sent the merchant 106 is merchant-specific. For example, a first merchant may receive the first name of user 102, while a second merchant may receive different user information, such as a rewards account number. The user information that is sent to merchant computing system 108 may be specified by the user 102, the merchant 106, or a combination thereof. In addition, the user information may contain information relating to parties other than the merchant 106 and the user 102. For example, the user information may include information from the advertiser computing system 122 (e.g., advertisement information), the third-party service computing system 120 (e.g., purchase history information), and/or the rewards provider computing system 118 (e.g., third-party rewards account information).

Further, along with the provision of the user information, the token service provider computing system 112 may provide a data link between the merchant computing system 108 and the user device 104 (either a direct data link or a data link facilitated through the token service provider computing system 112) such that the merchant computing system 108 can transmit messages directly to the user 102 via the user device 104. The message may relate to customized greetings (e.g., "Hi Steve, welcome to Store X!), sales information (e.g., "All movies are 25% off, today only"), loyalty information (e.g., "Steve, you are currently at 300 loyalty points."), or the like. The message may be received in the form of a text, an email, a push notification, or the like. Different merchants may broadcast to the user 102 in different ways. The user 102 may also set up the user account preferences to indicate what information and in what form broadcasts from the merchant 106 are received. Alternately, the merchant 106 may choose to share the user information internally. The merchant computing system 108 may provide the user information to a POS terminal, a device of an employee, or the like. For example, an employee may receive user information in order to greet the user 102 by name. The POS terminal may receive user information so the terminal has the loyalty number of the user 102 when the user 102 is ready to complete a transaction.

Figure 4:
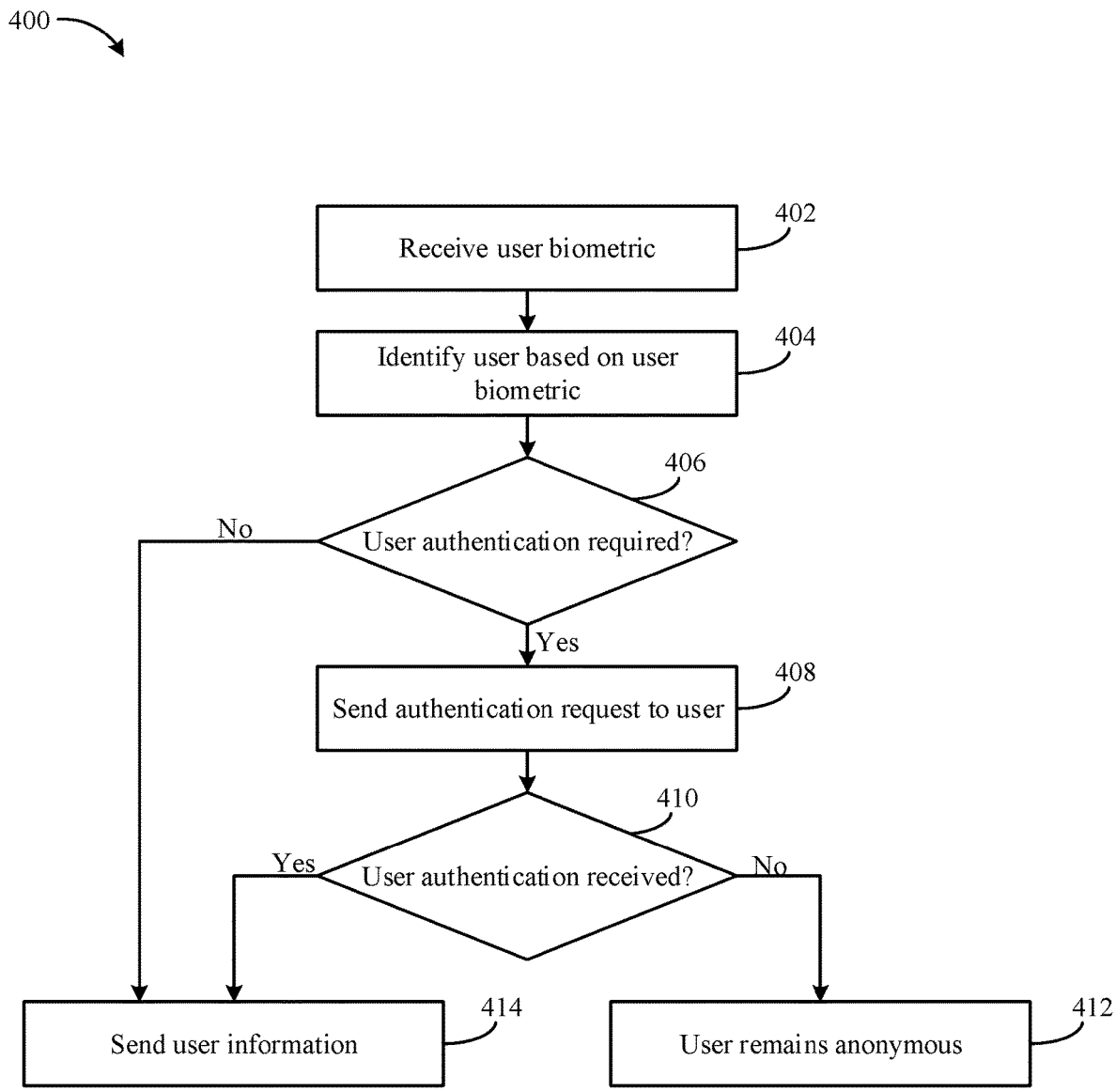
FIG. 4 is a flow diagram of a method of selectively identifying a user to a merchant through the token service provider and the merchant of FIG. 1 according to another example embodiment.

Referring to FIG. 4, a flow diagram of a method 400 of selectively identifying a user 102 to a merchant 106 through the token service provider 110 is shown according to another example embodiment. The method 400 is performed by the token service provider computing system 112 (e.g., by the universal identifier circuit 138). The method 400 is similar to the method 300. The primary difference between the method 400 and the method 300 is that in the method 400, the merchant computing system 108 transmits biometric information to the token service provider computing system 112 instead of a token (as done in the method 300). Accordingly, after completion of the method 200 (as described above), the user 102 identifies themselves to the merchant 106 by entering a location of the merchant 106, where the merchant computing system 108 gathers a biometric of the user 102 (e.g., via the biometric gathering circuit 134). As described in further detail below, the merchant computing system 108 sends the gathered biometric (or a hash thereof) to the token service provider 110, where the biometric (or hash thereof) is decoded to identify the user 102 such that user information can be provided to the merchant 106.

The method 400 begins when a user biometric is received at 402. The token service provider computing system 112 receives the user biometric from the merchant computing system 108 (e.g., from the biometric gathering circuit). The user biometric is received along with an identity request from the merchant 106. The identify request includes the user biometric and a request to provide user information concerning the subject of the user biometric (e.g., concerning the user 102). In some arrangements, the user biometric is a digital image file of the user 102 captured by a camera of the merchant computing system 108. In other arrangements, the user biometric is a voice recording file of the user 102 captured by a microphone of the merchant computing system 108. In further arrangements, the user biometric is a digital finger print or iris scan of the user 102 captured by a biometric scanner of the merchant computing system 108. In some arrangements, the user biometric is a character or numeric hash representing a gathered biometric.

The user is identified based on the user biometric at 404. The token service provider computing system 112 cross-references the token vault 144 with the received user biometric to identify the associated user account based on a verified biometric corresponding to the user 102. In some arrangements, the token service provider computing system 112 converts the user biometric into a string of characters representing the biometric through a biometric conversion algorithm. In such arrangements, the token service provider computing system 112 cross-references the token vault 144 with the string of characters to identify an associated user account. If no user account is associated with the received user biometric, the token service provider computing system 112 may return an error message to the merchant computing system 108, and the method 400 ends. In arrangements where a user account is identified, the method 400 continues.

The token service provider computing system 112 determines whether additional user authentication is required at 406 before providing the requested user information to the merchant 106. The token service provider computing system 112 cross-references the account database 142 to determine the authentication preferences of the user 102. In some arrangements, the user 102 configured the account such that the user 102 is required to authenticate all merchant requests for user information. In other arrangements, the user 102 configured the user account such that the user 102 is required to authenticate the certain merchant requests for user information based on an identity of the requesting merchant and/or the requested information. For example, certain pieces of user information, such financial account information, social security information, the user's address, and the like, may require a higher level of user authentication before being provided to the merchant 106.

If additional user authentication is required, an authentication request is sent to the user at 408. The token service provider computing system 112 formats and transmits an authentication request to the user device 104 associated with the user 102. The authentication request includes a date and time of the user biometric transmittal (at 402) and an identity of the merchant 106 that is requesting information about the user 102. In some arrangements, the authentication request may be formatted as a text message or an e-mail based on the user's preferences (e.g., as set in method 200 at 206). In such arrangements, the user 102 can respond to the message or e-mail or click on an embedded hyperlink that authenticates the request. In other arrangements, the authentication request is formatted as an in-application push message. In some arrangements, the authentication request includes a request for the user 102 to provide the user's password or a biometric to authenticate the information request. In further arrangements, the authentication includes matching a determined location of the user device 104 to a location of the merchant 106 (e.g., via GPS).

The token service provider computing system 112 determines whether user authentication is received at 410 in response to the request sent at 408. In some arrangements, the token service provider computing system 112 provides a response window (e.g., two minutes) for the user 102 to respond to the authentication request of 408. If the user authentication is not received at 410, the user's identity is not transmitted, and the user remains anonymous at 412. In some arrangements, the token service provider computing system 112 transmits an error to the merchant computing system 108, and the method 400 ends.

If the user authentication is received at 410 or if no user authentication is required at 406, user information is sent at 414. The token service provider computing system 112 retrieves the requested user information from the account database 142 and transmits the requested user information to the merchant computing system 108. The user information may include standard information about the user (e.g., first and last name, address, email, etc.), information relating to the user 102 and the merchant 106 (e.g., loyalty number, customer number, etc.), or the like. The token service provider computing system 112 can be configured such that the specific user information sent the merchant 106 is merchant-specific. For example, a first merchant may receive the first name of user 102, while a second merchant may receive different user information, such as a rewards account number. The user information that is sent to merchant computing system 108 may be specified by the user 102, the merchant 106, or a combination thereof. In addition, the user information may contain information relating to parties other than the merchant 106 and the user 102. For example, the user information may include information from the advertiser computing system 122 (e.g., advertisement information), the third-party service computing system 120 (e.g., purchase history information), and/or the rewards provider computing system 118 (e.g., third-party rewards account information).

Further, along with the provision of the user information, the token service provider computing system 112 may provide a data link between the merchant computing system 108 and the user device 104 (either a direct data link or a data link facilitated through the token service provider computing system 112) such that the merchant computing system 108 can transmit messages directly to the user 102 via the user device 104. The message may relate to customized greetings (e.g., "Hi Steve, welcome to Store X!), sales information (e.g., "All movies are 25% off, today only"), loyalty information (e.g., "Steve, you are currently at 400 loyalty points."), or the like. The message may be received in the form of a text, an email, a push notification, or the like. Different merchants may broadcast to the user 102 in different ways. The user 102 may also set up the user account preferences to indicate what information and in what form broadcasts from the merchant 106 are received. Alternately, the merchant 106 may choose to share the user information internally. The merchant computing system 108 may provide the user information to a POS terminal, a device of an employee, or the like. For example, an employee may receive user information in order to greet the user 102 by name. The POS terminal may receive user information so the terminal has the loyalty number of the user 102 when the user 102 is ready to complete a transaction.

Figure 5:
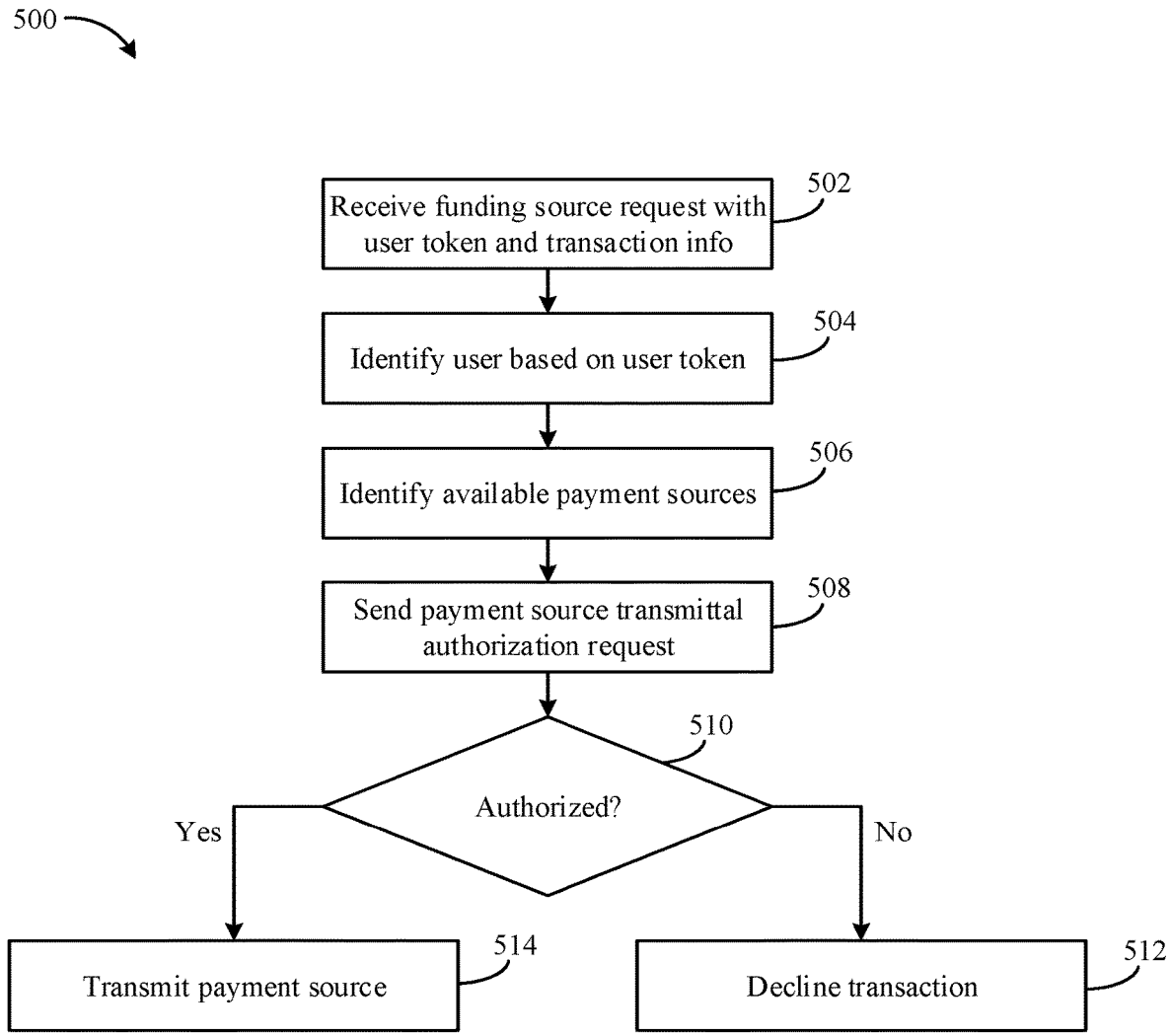
FIG. 5 is a flow diagram of a method 500 of providing a funding source for a transaction between a user and a merchant through the token service provider computing system of FIG. 1 according to an example embodiment.

FIG. 5 is a flow diagram of a method 500 of providing a funding source for a transaction between the user 102 and the merchant 106 through the token service provider computing system 112 according to an example embodiment. The method 500 is performed by the token service provider computing system 112, the merchant computing system 108 and the user computing device 104. Method 500 allows the user 102 and merchant 106 to complete a transaction by having the token service provider computing system 112 provide the necessary funding source from the financial institution 114. The method 500 may occur after the method 200.

The method 500 begins when a funding source request with a user token and transaction information is received at 502. The token service provider computing system 112 receives the funding source request from the merchant computing system 108. In some arrangements, the funding source request is transmitted from a POS system of the merchant computing system 108. The funding source request relates to a pending transaction between the merchant 106 and the user 102. The user token may be used by the token service provider 110 to identify the user 102 (e.g., as described above with respect to the method 300) and any available funding sources. The transaction information includes, for example, an identity of the merchant 106 and an amount of funds requested. In some arrangements, the transaction information also includes skew-level details surrounding the transaction (e.g., what specific items are being purchased). In an alternate arrangement, a user biometric is provided in place of the user token at 502.

The user is identified based on the user token at 504. The token service provider computing system 112 cross references the token vault 144 with the received user token to identify the associated user account. In an alternate arrangement where a user biometric was provided instead of a user token at 502, the token service provider computing system 112 identifies the user 102 in the same manner as described above with respect to steps 402 and 404 of the method 400. If no user account is associated with the received token, the token service provider computing system 112 may return an error message to the merchant computing system 108, and the method 500 ends. In arrangements where a user account is identified, the method 500 continues.

Available payment sources are identified at 506. The token service provider computing system 112 cross references the account database 142 based on the user identity to identify potential payment sources for the transaction. If no payment sources are associated with the user's account, the token service provider computing system 112 may return an error message to the merchant computing system 108, and the method 500 ends. In arrangements where the user 102 has at least one payment source associated with the user account is identified, the method 500 continues.

A payment source transmittal authorization request is transmitted at 508. The token service provider computing system 112 generates and transmits the payment source transmittal authorization request to the user device 104. The authorization request may be formatted as a text message, an e-mail, a push notification, or the like. The authorization request includes an identity of the merchant, transaction details (e.g., cost of the transaction, items being purchased, date of the transaction, time of the transaction, etc.), and an identified payment source (e.g., a credit card, a bank account, etc.). In arrangements where the user 102 has multiple payment sources configured with the token service provider 110, the authorization request includes a listing of potential payment sources that includes the multiple payment sources. In some arrangements, the listing of potential payment sources includes an identification of a user-selected default payment source of the plurality of payment sources. To authorize provision of the payment source from the token service provider 110 to the merchant 106, the user 102 responds to the authorization request with and authorization or a denial. The user 102 can respond to the authorization request by interacting with an embedded hyperlink that authenticates the request. In some arrangements, the authentication request includes a request for the user 102 to provide the user's password or a biometric to authenticate the information request. In further arrangements, the authentication includes matching a determined location of the user device 104 to a location of the merchant 106 (e.g., via GPS). Additionally, in arrangements where the user 102 has multiple payment sources configured, the response to the authorization request may include an identification of a selected payment source of the multiple available payment sources if the user 102 does not wish to use the default payment source. In an alternative arrangement, if no identification of a payment source of the multiple payment sources is provided by the user, the token service provider 110 may proceed with a default payment source as programmed in the user preferences.

The token service provider computing system 112 determines if a proper authorization for the payment source transmittal was received from the user device 104 at 510. If a proper authorization for the payment source provision was not received, the transaction is declined at 512. In some arrangements, the token service provider computing system 112 transmits an error to the merchant computing system 108 and/or the user device 104, and the method 500 ends.

If a proper authorization for the payment source provision was received at 510, the payment source is transmitted at 514. The token service provider computing system 112 transmits the payment source (either the only payment source on file for the user 102 or the payment source identified at 510) to the merchant computing system 108. In some arrangements, the token service provider computing system 112 transmits the payment source directly to a POS system of the merchant computing system 108. The payment source may be formatted as credit card information (e.g., a credit card account number, a credit card verification code, a credit card expiration date, etc.), a bank account number and routing number, or a payment token (e.g., a credit card token) such that the merchant computing system 108 can process the payment through traditional channels (e.g., a credit card network, an ACH transfer facilitated by the financial institution computing system 116, etc.). In some arrangements, a confirmation message is generated and transmitted by the token service provider computing system 112 to the user device 104 to confirm transmittal of the payment source to the merchant 106.

The above-described systems and methods provide enhanced ways for users to selectively provide user information and payment sources to merchants. These systems and methods eliminate the need for users to carry a plurality of loyalty cards, membership cards, and the like. For example, the above-described user token or user biometric can be used in place of a rewards account card or a gym membership card. Additionally, the above-described systems and methods allow for merchants to provide enhanced user recognition services to users. The enhanced user recognition services provide a non-intrusive way for merchants to learn the identity of customers in their stores, provide customized greetings to customers that enter a store, to provide targeted offers to the customers in their stores, and the like.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of identifying a user using a token service provider, the method comprising:
    creating, by a token service provider computing system associated with the token service provider, a user account with the token service provider for the user, wherein the user account includes user information;
    creating, by the token service provider computing system, a token for the user, wherein the token comprises a hashed string of a verified user biometric and wherein the token is a proxy for the user information, and wherein creating the token includes applying a biometric conversion algorithm to the verified user biometric to generate a string and hashing the string to generate the hashed string;
    sending, by the token service provider computing system to a user device associated with the user, a notification indicating that a merchant is requesting the user information of the user;
    sending, by the token service provider computing system, the token to the user device, wherein the token is configured to be activated by the user via the user device when the user is in a vicinity of the merchant such that the token is selectively broadcasted by the user device after activation;
    receiving, by the token service provider computing system, the token from a merchant computing system associated with a merchant;
    mapping, by the token service provider computing system, the hashed string from the token to an account identifier to identify the user account;
    identifying, by the token service provider computing system, the user and the user information based on the user account; and
    receiving, by the token service provider computing system, a rejection from the user device thereby preventing the token service provider computing system from providing the user information to the merchant computing system.

2. The method of claim 1, wherein the merchant computing system captured the token from a broadcast of the token from the user device.

3. The method of claim 1, further comprising sending, by the token service provider computing system, the user information to the merchant computing system.

4. The method of claim 3, wherein the user information sent to the merchant computing system is merchant-specific user information.

5. The method of claim 1, further comprising receiving, by the token service provider computing system, authentication from the user device for the token service provider computing system to provide the user information to the merchant computing system.

6. The method of claim 5, wherein the authentication includes a biometric of the user.

7. The method of claim 1, further comprising sending, by the token service provider computing system, a payment source associated with the user to the merchant computing system.

* * * * *